United States Patent [19]
Schwartz et al.

[11] Patent Number: 5,481,736
[45] Date of Patent: Jan. 2, 1996

[54] COMPUTER PROCESSING ELEMENT HAVING FIRST AND SECOND FUNCTIONAL UNITS ACCESSING SHARED MEMORY OUTPUT PORT ON PRIORITIZED BASIS

[75] Inventors: David A. Schwartz, Moorpark; James J. Radigan, Sunnyvale, both of Calif.

[73] Assignee: Hughes Aircraft Company, Los Angeles, Calif.

[21] Appl. No.: 18,683

[22] Filed: Feb. 17, 1993

[51] Int. Cl.$^6$ .................................................. G06F 9/30
[52] U.S. Cl. ................... 395/800; 395/375; 364/258.2; 364/268.4; 364/724.13; 364/ DIG. 1
[58] Field of Search .................... 395/275, 425, 395/650, 775, 800, 375; 364/736, 748, 749, 750.5, 258.2, 268.4, 724.13, 937.1, 937.4, 736.5

[56] References Cited

U.S. PATENT DOCUMENTS

| | | | |
|---|---|---|---|
| 4,999,803 | 3/1991 | Turrini et al. | 364/748 |
| 5,055,997 | 10/1991 | Sluijter et al. | 364/736 |
| 5,113,508 | 5/1992 | Groves et al. | 395/425 |
| 5,125,083 | 6/1992 | Fite et al. | 395/375 |
| 5,175,702 | 12/1992 | Beraud et al. | 364/736 |
| 5,175,841 | 12/1992 | Magar et al. | 395/425 |
| 5,182,801 | 1/1993 | Asfour | 395/425 |
| 5,204,957 | 4/1993 | Wilkie et al. | 395/800 |
| 5,204,962 | 4/1993 | Uramoto et al. | 395/775 |
| 5,241,492 | 8/1993 | Girardeau et al. | 364/736 |
| 5,249,149 | 9/1983 | Cocanougher et al. | 364/748 |
| 5,287,532 | 2/1994 | Hunt | 395/800 |

OTHER PUBLICATIONS

Nash et al, "The Systolic/Cellular System for Signal Processing", *Computer*, Jul. 1987, 2 pages.

Przytula et al, "A Special Purpose Coprocessor for Signal Processing", 21st Asilomar Conf. on Signals, Systems and Computers, Monterey, Calif., Nov. 1987, 5 pages.

Przytula, "Medium Grain Parallel Architecture for Image and Signal Processing", *Parallel Architectures and Algorithms for Image Understanding*, 1991.

Primary Examiner—Thomas C. Lee
Assistant Examiner—Moustafa Mohamed Meky
Attorney, Agent, or Firm—V. D. Duraiswamy; W. K. Denson-Low

[57] ABSTRACT

A processing element (42) design is provided for improving performance and reducing the number (30') of memory ports by eliminating the dedication of ports to specific functional units (22, 24, 26, 28) and by providing data paths (46, 48, 50, 52) to other forward results from functional unit outputs directly to other functional unit inputs.

15 Claims, 4 Drawing Sheets

COMPUTER PROCESSING ELEMENT HAVING FIRST AND SECOND FUNCTIONAL UNITS ACCESSING SHARED MEMORY OUTPUT PORT ON PRIORITIZED BASIS

BACKGROUND OF THE INVENTION

1. Technical Field

This invention relates to computer processors and, more particularly, to multi-ported memory devices for use in such processors.

2. Discussion

Very long instruction word (VLIW) and super-scalar processor techniques for very high performance computer processors require multi-ported register files to support multiple function unit concurrency. VLIW and super-scalar make up two of the three leading techniques (the other being super-pipelining) currently being used to extend the performance of high-end, state of the art microprocessors. VLIW and super-scalar extend uni-processor performance by executing more than one function/operation per clock. The current standard approach to support the concurrency is to feed the operands to multiple function units, and write the results back, to a multi-ported register file. The ports of the register file are dedicated to specific functional units. For example, the Intel iWarp processor dedicates specific ports to the input and outputs of the functional units (integer, floating point multiplier, and floating point ALU) and uses special hardwired memory locations and ports to implement the specialized interconnections to the stream gates and local memory unit. The iWarp's use of dedicated ports brings the total number of effective ports to 9 read and 6 write ports. Matsushita's newest microprocessor, the Ohmega processor, uses a six port multi-ported register file with dedicated read and write ports. The Ohmega processor is a super-scalar processor. Its floating point register file is connected to a floating point ALU (2 read and 1 write) and a floating point multiplier (2 read and 1 write). Similarly, the addressing function units are connected to dedicated ports of a six port (integer) register file. Weitek's newest floating point processor, the W4164, is based on an eight ported register file. The ports are dedicated to specific function units: multiplier/divider 2 read, 1 write, floating point ALU 2 read, 1 write, and a processor read End write port.

The dedicated memory port approach is a wasteful use of resources because typical instruction usage does not use all available ports simultaneously. Extra ports require increased chip complexity and cost. Extra memory ports also reduce the speed of the memory (and possibly the processor). Prior microcoded processors that used limited port sharing had processor instructions that encoded not only the address of the registers that needed to be read or written but also encoded the information of which port to use (multiplexer selects).

The present invention is directed to solving one or more of these problems.

SUMMARY OF THE INVENTION

In accordance with the teachings of the present invention, a processing element for a computer system is provided with a multi-ported memory. The processing element includes at least two functional units for performing different functions on data applied to their inputs, each functional unit generating a result at their respective outputs. A multiplexing arrangement is used to connect a single memory output port to a plurality of inputs of the functional units. Data paths are provided for forwarding the output of at least one functional unit to the input of another functional unit while bypassing the memory.

The present invention provides a reduction in the number of memory ports by sharing the ports over multiple functional units and providing data paths to forward results from functional unit outputs directly to functional unit inputs. This is in contrast to previous approaches where memory output ports are dedicated on a one-to-one basis with a specific functional unit input and wherein the result outputted by the functional unit is coupled back to a dedicated input port of the memory.

BRIEF DESCRIPTION OF THE DRAWINGS

Still other advantages of the present invention will become apparent to those skilled in the art after studying the specification and by reference to the drawings in which.

DETAILED DESCRIPTION OF THE PREFERRED EMBODIMENT

Figure 1:
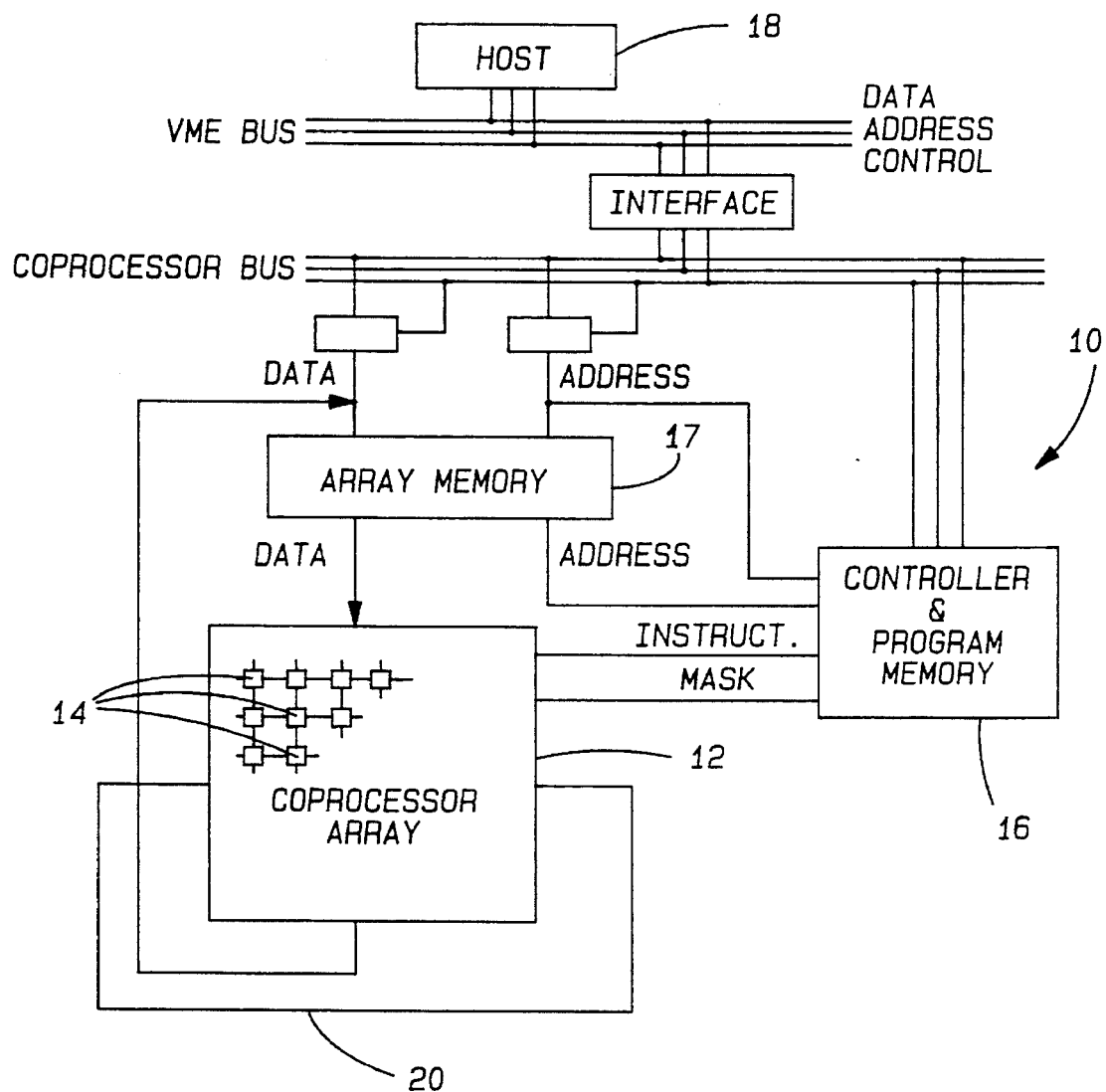
FIG. 1 is a block diagram of a computer system architecture in which the present invention finds particular utility.

While the present invention has applicability to a wide variety of computer systems, including generator purpose computers, the invention will be described in connection with a special purpose computer system 10 shown in FIG. 1. System 10 is based on a two-dimensional co-processor array 12 employing an M×N matrix of mesh connected processing elements (PEs) 14. All of the PEs 14 are controlled by a controller 16. In one mode of operation, the input data are first loaded into the PEs 14 from memory 17 and then processed in unison in a single instruction multiple data (SIMD) mode. After the computation is completed, the results in the processor array 12 are unloaded. The next computation cycle can then begin. The host 18 is a general purpose computer with an open architecture responsible for processing of sequential algorithms and interfacing with the outside world. The co-processor array 12 is attached to the bus of the host and is also programmable. Co-processor array 12 is intended for high speed processing of select classes of parallel algorithms. The host 18 loads the data and programs into the co-processor, initiates the execution of the programs, and unloads the results. The PEs in array 12 are connected to their four nearest neighbors. In addition, the top and bottom rows are connected to memory 17 and there is a wraparound connection 20 between the boundary columns of the PEs.

Figures 2, 3:
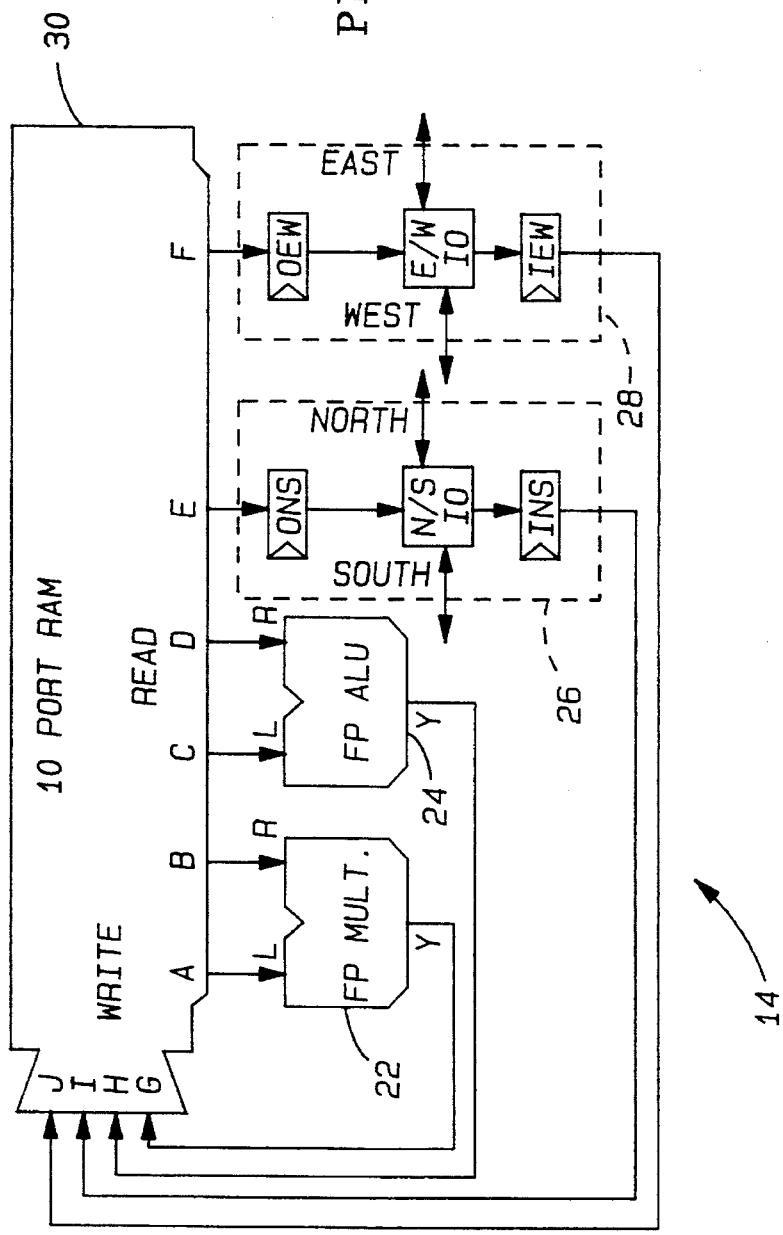
FIG. 2 is a schematic diagram of a PRIOR ART processing element design useful in understanding the problems solved by the present invention.
FIG. 3 is a PRIOR ART baseline microcode instruction format used in the processing element of FIG. 2.

FIG. 2 illustrates an example of a PE 14 architecture which is useful in understanding the problems solved by the present invention. It illustrates a conventional very long instruction word (VLIW) design which includes a multiply functional unit 22, an arithmetic and logic unit (ALU) 24, a N/S input/output (I/O) unit 26 and an E/W I/O unit 28. The multiply unit 22 and ALU unit 24 operate on one or two operands applied to their respective inputs and generate a result at their outputs. Both of the I/O units 26, 28 operate to either receive or transfer data to neighboring PEs.

The conventional approach shown in FIG. 2 uses a multi ported random access memory 30 with ports that are dedicated to each of the units 22, 24, 26 and 28. This results in a total of 10 ports for memory 30, six read ports (A–F) and four write ports (G–J). FIG. 3 illustrates a simple VLIW type instruction word format for the PE design of FIG. 2, ignoring sequencer control issues.

As should now be appreciated by those skilled in the art, the PE design of FIGS. 2 and 3 is not optimal. It requires a relatively large number of memory ports. The excessive memory ports cost chip area and tend to lower the speed of the memory/register file. In addition, the instruction word (FIG. 3) must specify the addresses of 10 ports which means that the instruction format generally must use a relatively large number of bits to define these addresses.

Figure 4:
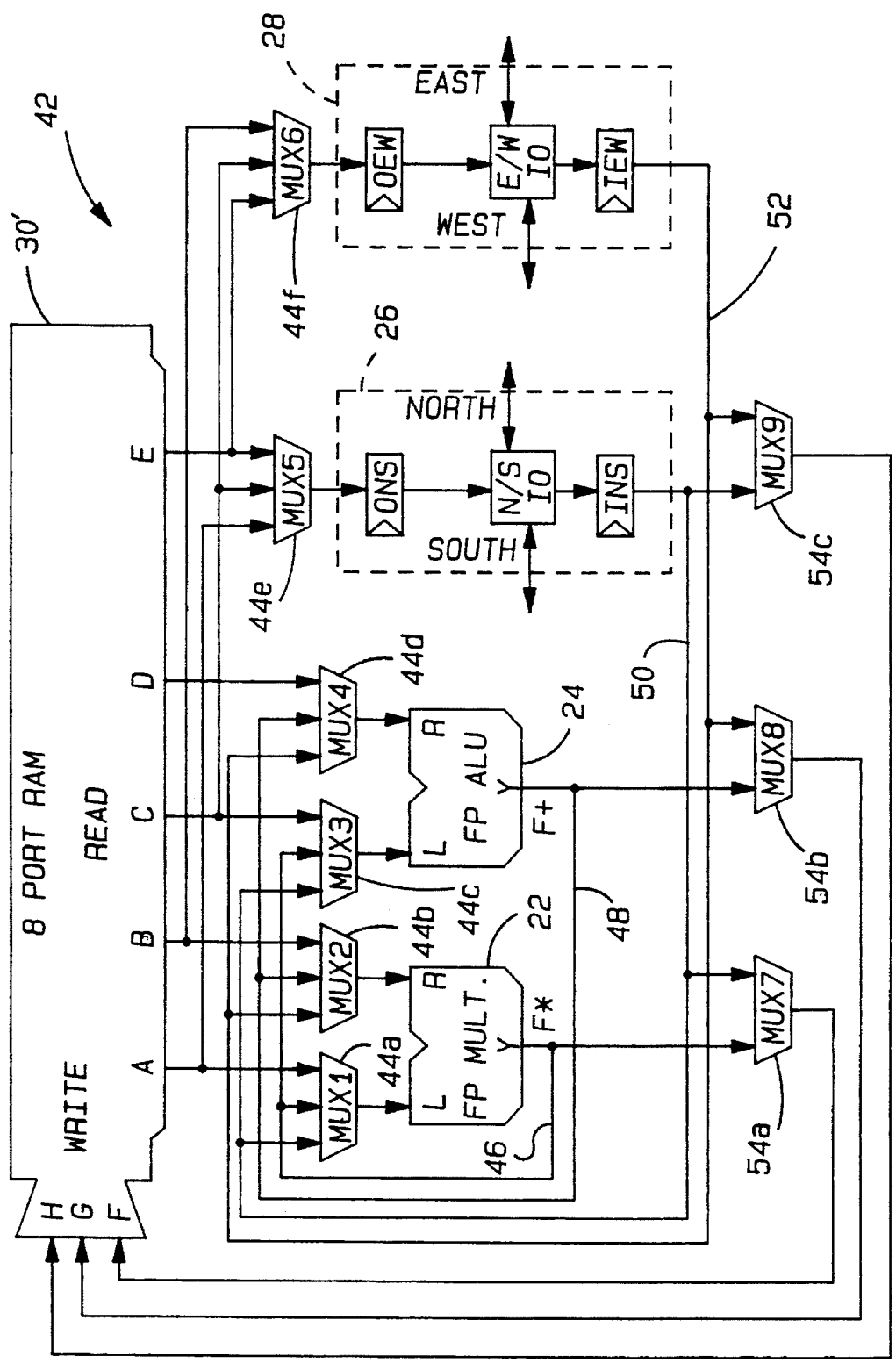
FIG. 4 is a schematic diagram of a processing element made in accordance with the teachings of the present invention.

FIG. 4 illustrates a PE 42 designed in accordance with the teachings of the present invention. A comparison of the inventive design with the PRIOR ART design of FIG. 2 shows a significant reduction in the number of ports for the memory 30', yet the number and function of the units 22, 24, 26 and 28 remain the same. The reduction in memory ports capitalizes on the observation that the units do not always simultaneously use their read and write ports. For example, I/O units 26 and 28 often do not use their read and write ports simultaneously. Thus, at least two memory ports in the PRIOR ART design of FIG. 2 are idle on every instruction. In addition, some of the instructions operated on by the multiply unit 22 and ALU unit 24 are unary (i.e., operate on data applied to only one of their two inputs). Thus, these units only need one memory read port instead of two. Furthermore, in many applications, all of the units 22, 24, 26 and 28 are not used simultaneously in carrying out any given operation.

In accordance with the preferred embodiment of the invention, a first series 44 of multiplexers are provided to enable the units 22, 24, 26 and 28 to share input and output ports of the memory 30'. In addition, feedforward data paths are provided to reduce operation latency and to lower the average number of memory file ports required. A feedforward data path 46 connects the output of the multiplier unit 22 to inputs of both the multiplier unit 22 and the ALU unit 24 via multiplexers 44(a) and 44(c). Feedforward data path 48 connects the output of ALU unit 24 to the input of multiplier 22 via multiplexer 44(b) and to an input of the ALU unit 24 via multiplexer 44(d). Feedforward data path 50 couples the output of N/S I/O unit 26 to one input of multiplier unit 22 via multiplexer 44(a) and to an input of ALU unit 24 through multiplexer 44(c). In a similar manner, feedforward data path 52 couples the output of the E/W I/O unit 28 to an input of multiplier unit 22 via multiplexer 44(b) and to ALU unit 24 via multiplexer 44(d).

The outputs of the units 22–28 also share the memory write ports F, G and H through a second series of multiplexers 54. Multiplexer 54(a) selectively couples the outputs of multiplier unit 22 or the N/S I/O unit 26 to memory ports F. Multiplexer 54(b) connects the output of ALU unit 24 or the E/W I/O unit 28 to input port G. Analogously, multiplexer 54(c) couples the output of the N/S I/O unit 26 or the E/W I/O unit 28 to input port H of memory 30'.

Figure 5:
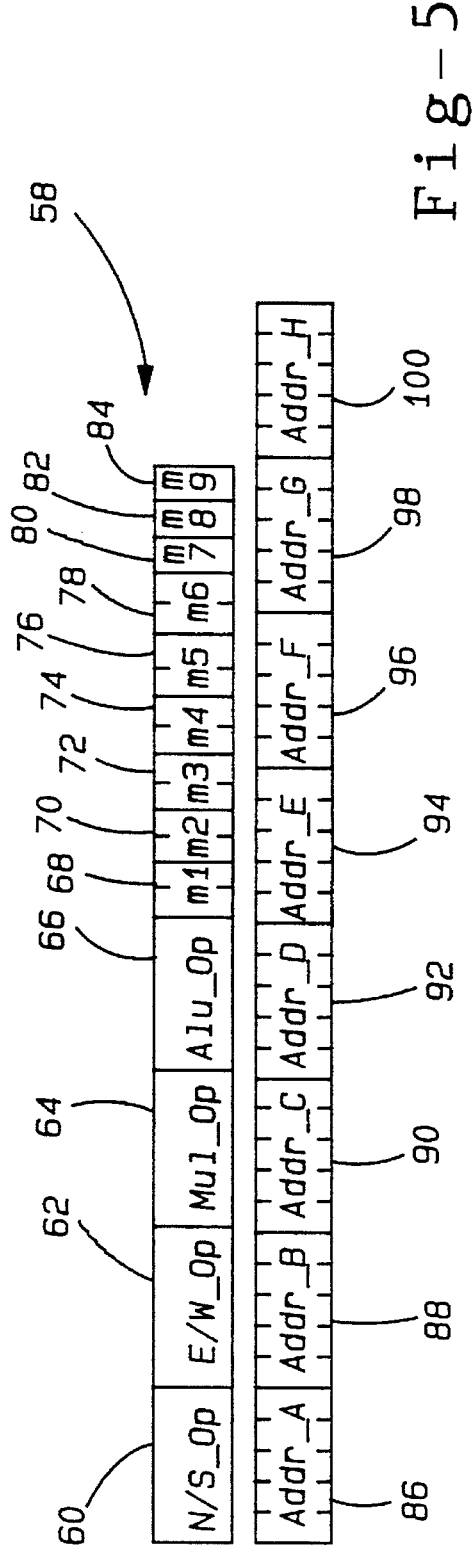
FIG. 5 is one embodiment of an instruction format for use with the processing element design of FIG. 4.

One instruction format that can be used in connection with the improved PE design is shown in FIG. 5. The VLIW instruction word 58 includes a series of fields for controlling the operation of the PE 42. Field 60 defines the operation code (opcode) for defining the operation to be performed by the N/S I/O unit 26. Likewise, fields 62, 64 and 66 define the opcodes for the E/W I/O unit 28, multiplier unit 22 and ALU unit 24, respectively. Fields 68–78 control the switching of the desired input of multiplexers 44(a)–44(f) to their respective outputs. Fields 80–84 similarly control multiplexer devices 54(a)–54(c). Fields 86–100 define the addresses of ports A–H of memory 30'.

The design of FIG. 4 has the restriction that there can only be five simultaneous reads from memory 30' and three simultaneous writes to the memory 30'. Thus, there are combinations of operations in one instruction that violate these resource limits. There is also the additional complication that if the (pipeline) length of the function units differ, then writes from one instruction can occur at different times. Thus, write resource conflicts can arise as the combination of writes from several instructions and without restrictions on branching may occur dynamically and may be statically undeterminable.

There are two basic ways to deal with this resource constraint. The first is to declare any instructions that violate the resource constraints to be illegal. This can be enforced by software (compiler/assembler) and optionally trapped by hardware. The second approach is to add a hardware interlock mechanism which stalls the dispatching of new instructions until the current instruction can be completed by partial serialization. For example, read five operands, then stall the processor and then read the sixth operand. In the case of a super scalar design, no interlock is necessary. The instruction fetch/issue unit will only combine operations together that meet resource constraints.

Figure 6:
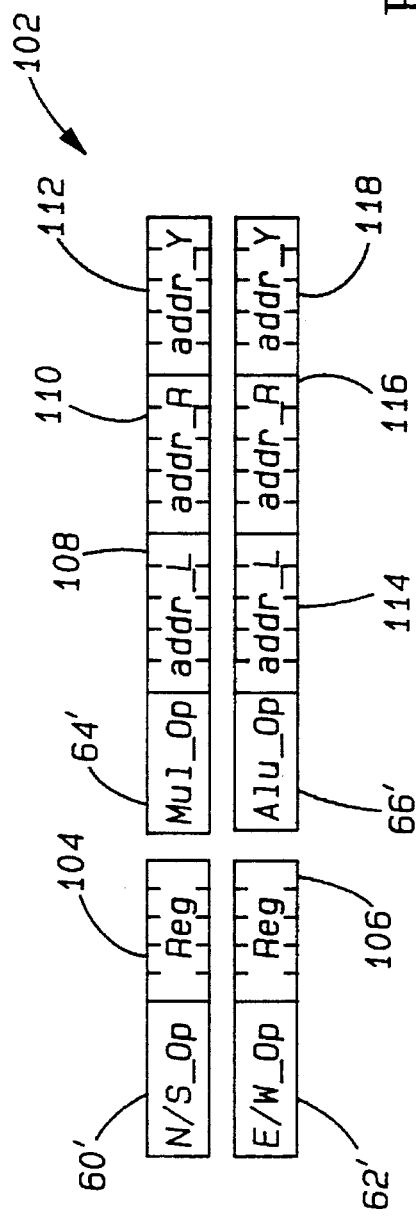
FIG. 6 is an alternative and presently preferred instruction format for use with the processing element design of FIG. 4.

It is possible to reduce the number of bits necessary to encode the instructions from the number of bits in the FIG. 5 instruction. It is noted that the I/O operation units 26, 28 specify only a single address which is either a read or write depending on the opcode of the associated I/O. Instead of explicitly specifying the control of the multiplexers 44(a–f) and 54(a–c), it can be done implicitly by "smart decoding" of the operations. FIG. 6 shows an instruction format 102 based on "smart port" decoding.

In the instruction 102 the opcode 60' and 62' for the I/O units 26, 28 imply whether the register defined by the address fields 104, 106 are sources or destinations. For example, if the opcode in field 60' designates a write operation, it is implicitly known that the data is to be written into the register address defined by field 104. Fields 108 and 110 define the left and right operands for inputs L and R of the multiplier unit 22. Field 112 defines the address of the location in memory 30' for storing the result generated at the output F*, path 48, of unit 22. Similarly, fields 114, 116 define the operands for ALU unit 24, with field 118 defining the address location for the result.

TABLE I

| Op | Operands/Destination | Value | Selected Source/Destination |
|---|---|---|---|
| MULT | L | 0 to 29 | Register n |
|  |  | 30 | I/O N/S |
|  |  | 31 | Feedforward (F*) |
|  | R | 0 to 29 | Register n |
|  |  | 30 | I/O E/W |
|  |  | 31 | Feedforward (F+) |
|  | Y | 0 to 29 | Register n |
|  |  | 30 | reserved |
|  |  | 31 | Feedforward (F*) |
| ALU | L | 0 to 29 | Register n |
|  |  | 30 | I/O N/S |
|  |  | 31 | Feedforward (F*) |
|  | R | 0 to 29 | Register n |

TABLE I-continued

| Op | Operands/ Destination | Value | Selected Source/ Destination |
|---|---|---|---|
|  |  | 30 | I/O E/W |
|  |  | 31 | Feedforward (F+) |
|  | Y | 0 to 29 | Register n |
|  |  | 30 | reserved |
|  |  | 31 | Feedforward (F+) |
| E/W IO | Reg | 0 to 29 | Register n |
| N/S IO | Reg | 0 to 29 | Register n |

In Table I the designation of L is interpreted to mean the left operand applied to the input of the multiplier or ALU units 22, 24. For example, if L provides a value of 0 to 29 then the multiplexer 44(a) operates on the operand located in register n which is coupled to port A of memory 30'. If the value of L is 30 then the output on line 50 from the I/O N/S unit 26 is coupled through multiplexer 44(a) to the L input of multiplier 22. On the other hand, if L renders a value of 31, then the multiplexer 44(a) couples the output of F*, to the input L of multiplier unit 22.

In order to prevent control line conflicts, the invention provides rules that are based on the context of the currently executing instruction. For example, the rules for the ports of FIG. 4 are based on the following:

The multiplier 22 always gets first priority for ports A, B, and F

The ALU 24 always gets first priority for ports C, D, and G

The North/South I/O 26 gets second priority for ports A, C, E, F, and H

The East/West I/O 28 gets third priority for ports B, C, E, G, and H

These priority rules for the ports combined with the decoding information in Table I leads to a straightforward design of combinatorial logic to control the port select multiplexers 44(a–f) and 54(a–c) using the information in the instruction word (FIG. 6).

From a study of the foregoing, those skilled in the art can appreciate that the present invention provides an eloquently simple technique for reducing the number of ports required in processing element of the type described. It should be understood, however, that while this invention was described in connection with a particular example, the invention is not intended to be limited to that particular example since other modifications will become apparent to those skilled in the art.

What is claimed is:

1. A processing element for a computer system, said processing element comprising:

memory means having a limited number of input ports and a limited number of output ports, the memory means having at least two input ports and at least two output ports; at least first and second functional unit means, said first functional unit means, having M inputs, for performing a first function on data applied to at least one input thereof and for generating a result at its output, and said second functional unit means, having N inputs, for performing a second function on data applied to at least one input thereof and generating a result at its output;

multiplexer means for connecting a single memory output port to inputs of both the first and second functional units to permit sharing therebetween; and data path means for forwarding the output result of the first functional unit to an input of the second functional unit while bypassing the memory means, wherein, said memory means having less than M+N output ports, where M and N are integers, wherein the functional units are prioritized to thereby give the one functional unit having priority access to the single memory output port in the event that the functional units attempt to concurrently execute instructions calling for access to the single memory output port.

2. The processing element of claim 1 which further comprises:

first input/output (I/O) means having inputs for receiving data and an output for transmitting data; and second I/O means having inputs for receiving data and an output for transmitting data, wherein at least one of the memory output ports is connected to both an input of one of the functional units and to an input of one of the I/O means.

3. The processing element of claim 2 wherein the data path means further comprises:

means for forwarding an output of one of the I/O means an input of at least one or more of the functional unit means.

4. The processing element of claim 3 wherein said multiplexer means comprises:

a series of multiplexer devices, at least one multiplexer device for each input of each functional unit and for each input of each I/O means, each multiplexer device having a plurality of inputs and an output connected to its respective functional unit or I/O means, wherein the inputs of the multiplexer device which is connected to the first functional unit are coupled to:

a) an output port from the memory means;

b) an output from the second functional unit; and c) an output from one of the I/O means 5. The processing element of claim 4 wherein the inputs of the multiplexer device connected to the first I/O means are connected to a plurality of output ports of the memory means.

6. The processing element of claim 5 wherein said data path means further comprises:

a second series of multiplexer devices for selectively connecting outputs of the functional units and I/O means to input ports of the memory means.

7. The processing element of claim 6 wherein said second series of multiplexer devices comprises:

a first multiplexer device having inputs connected to the outputs of the first and second I/O means and having an output connected to one of the memory input ports;

a second multiplexer device having inputs connected to an output of the first I/O means and one of the functional units, with an output thereof being coupled to a second input port of the memory means; and a third multiplexer device having inputs coupled to an output of the second I/O means and the other functional unit, with an output thereof being coupled to a third input port of the memory means.

8. A computer system comprising:

a host computer;

a co-processor array having a plurality of mesh connected processing elements (PEs), a controller for generating a very long instructions word (VLIW) for controlling the operations of the processing elements, said processing elements performing the same instruction on multiple data associated with each processing element, each of said processing elements including:

random access memory means having a plurality of memory locations for storing data, said memory means having a limited number of input ports and a limited number of output ports, the memory means having at least two input ports and at least two output ports at least first and second functional unit means, said first functional unit means, having M inputs, for performing a first function on data applied to at least one of its input and for generating a result at its output, and said second functional unit means, having N inputs, for performing a second function on data applied to its input and generating a result at its output;

multiplexer means for selectively connecting a single memory output port to inputs of both the first and second functional units; and data path means for forwarding the output result of the first functional unit to an input of the second functional unit while bypassing the memory means, wherein, said memory means having less than M+N output ports, where M and N are integers, wherein said functional units are given access to said single memory output port on prioritized basis.

9. The system of claim 8 wherein said first functional unit comprises multiplier means for multiplying together two operands applied to two of its inputs; and said second functional unit comprises arithmetic logic unit (ALU) means for performing arithmetic functions on operands applied to two of its inputs.

10. The system of claim 9 wherein said multiplexer means comprises:

a first multiplexer device coupled to a first input of the multiplier means;

a second multiplexer device connected to a second input of the multiplier means;

a third multiplexer device connected to a first input of the ALU means; and a fourth multiplexer device connected to a second input of the ALU means.

11. The system of claim 10 which further comprises:

first input/output (I/O) means having an input for receiving data and an output for transmitting data; and second I/O means having an input for receiving data and an output for transmitting data; and wherein at least one of the memory output ports is connected to both an input of one of the functional units and to an input of one of the I/O means.

12. The system of claim 11 wherein said data path means further comprises:

a second series of multiplexer devices for selectively connecting outputs of the functional units and I/O means to input ports of the memory.

13. The system of claim 12 wherein said second series of multiplexer devices comprises:

a first multiplexer having inputs connected to the outputs of the first and second I/O means and having an output connected to one of the memory input ports;

a second multiplexer device having inputs connected to an output of the first I/O means and one of the functional units, with an output thereof being coupled to a second input port of the memory means; and a third device having inputs coupled to an output of the second I/O means and the other functional unit, with an output thereof being coupled to a third input port of the memory means.

14. The system of claim 13 wherein the memory means has five output ports coupled to the multiplexer means, and three input ports coupled to the second series of multiplexer devices.

15. The processing unit of claim 14 wherein the multiplier means, arithmetic logic unit means, first input/output means and second input/output means are given access to shared memory ports on prioritized basis.

* * * * *